United States Patent [19]
Yokomichi et al.

[11] Patent Number: 5,142,116
[45] Date of Patent: Aug. 25, 1992

[54] WIRE CUTTING ELECTRIC DISCHARGE MACHINE

[75] Inventors: Shigeharu Yokomichi, Atsugi; Yasunori Ono, Hadano, both of Japan

[73] Assignee: Amada Wasino Co., Ltd., Japan

[21] Appl. No.: 540,754

[22] Filed: Jun. 20, 1990

[30] Foreign Application Priority Data

Jun. 24, 1989 [JP] Japan ................................. 1-162084

[51] Int. Cl.$^5$ ............................................. B23H 7/10
[52] U.S. Cl. ............................................. 219/69.12
[58] Field of Search ................... 219/69.12; 226/172, 226/170, 171, 183, 190

[56] References Cited

U.S. PATENT DOCUMENTS

| | | | |
|---|---|---|---|
| B1 3,891,819 | 11/1985 | Ullmann et al. | 219/69.12 |
| 3,891,819 | 6/1975 | Ullmann et al. | 219/69.12 |
| 3,987,270 | 10/1976 | Ullmann et al. | 219/69.12 |
| 4,243,864 | 1/1981 | Vieau et al. | 219/69.12 |
| 4,414,458 | 11/1983 | Nomura | 219/69.12 |
| 4,603,799 | 8/1986 | Schaerer | 226/171 |
| 4,929,809 | 5/1990 | Aso et al. | 219/69.12 |
| 4,978,828 | 12/1990 | Umetsu et al. | 219/69.12 |
| 4,999,473 | 3/1991 | Gamo et al. | 219/69.12 |
| 5,032,701 | 7/1991 | Umetsu et al. | 219/69.12 |

FOREIGN PATENT DOCUMENTS

| | | |
|---|---|---|
| 161046 | 3/1985 | European Pat. Off. . |
| 233297 | 8/1986 | European Pat. Off. . |
| 1594057 | 3/1978 | United Kingdom . |
| 2086799 | 11/1981 | United Kingdom . |

Primary Examiner—Geoffrey S. Evans
Attorney, Agent, or Firm—Wigman & Cohen

[57] ABSTRACT

A wire cutting electric discharge machine with a wire guide roller having a V-shaped groove beneath the workpiece, and a wire guide between the guide roller and a conveyor belt.

3 Claims, 3 Drawing Sheets

WIRE CUTTING ELECTRIC DISCHARGE MACHINE

BACKGROUND OF THE INVENTION

1. Field of the Invention

The present invention relates to a wire cutting electric discharge machine, and, in particular, to an improved wire cutting electric discharge machine with high processing precision, a low incidence of wire breakage, and which operates at high efficiency.

2. Description of the Prior Art

In conventional wire cutting electric discharge machine, such as that disclosed in Japanese Laid Open Patent No. S55-46806, a wire electrode is firmly attached to a transport mechanism and transported along a straight path which includes a processing section.

In a conventional configuration as described above, however, the vibration from the transport mechanism is transmitted directly to the wire electrode in the straight path so that the operation become unstable, processing precision deteriorates, and many problems, such as wire electrode breakage are produced.

SUMMARY OF THE INVENTION

An object of the present invention is to provide, with due consideration to the drawbacks of such conventional devices, a wire cutting electric dischare machine which has high processing precision, a low incidence of wire breakage, and which operates at high efficiency.

This object is achieved in the present invention by the provision of a wire cutting electric discharge machine comprising; a guide roller which guides a wire electrode laterally away from the area of process of the discharge machine, the guide roller being provided below a workpiece which is being processed in the discharge machine; a transport mechanism which transports laterally the wire electrode from the guide roller further away from the area of process of the discharge machine; and a withdrawal mechanism positioned at a portion following the transport mechanism, and which engages and withdraws the wire electrode transported by the transport mechanism.

The guide roller is preferably provided with a groove.

As a result of this configuration, when the wire electrode being transported from a wire feed device of the wire cutting electric discharge machine passes through a lower wire guide device and proceeds downward, the wire electrode is guided by means of the guide roller and is transported laterally away from the area of process by the transport device which may comprise a transport belt. The wire electrode is then withdrawn by being pulled, firmly attached to a moving roller of the withdrawal mechanism at the down stream end of the transport device.

In this configuration, the wire electrode contacts the guide roller along a line rather than contacts at a point. Thus, the longitudinal and lateral vibrations of the withdrawal mechanism can be absorbed in the transport device without transmitting to a section of the wire electrode at the processing section. Further, because the distance to the withdrawal mechanism section is long, the vibration from the withdrawal mechanism is damped, so that the adverse effect on the processing section is minimized, the operation is stabilized and precision thereof is improved. In addition, if the guide roller for switching direction is provided with a groove, the vibration of the electrode in the lateral direction is further reduced.

BRIEF DESCRIPTION OF THE DRAWINGS

These and other objects, features, and advantages of the present invention will become more apparatus from the following description of the preferred embodiments taken in conjunction with the accompanying drawings, in which.

DETAILED DESCRIPTION OF THE PREFERRED EMBODIMENTS

Figure 1:
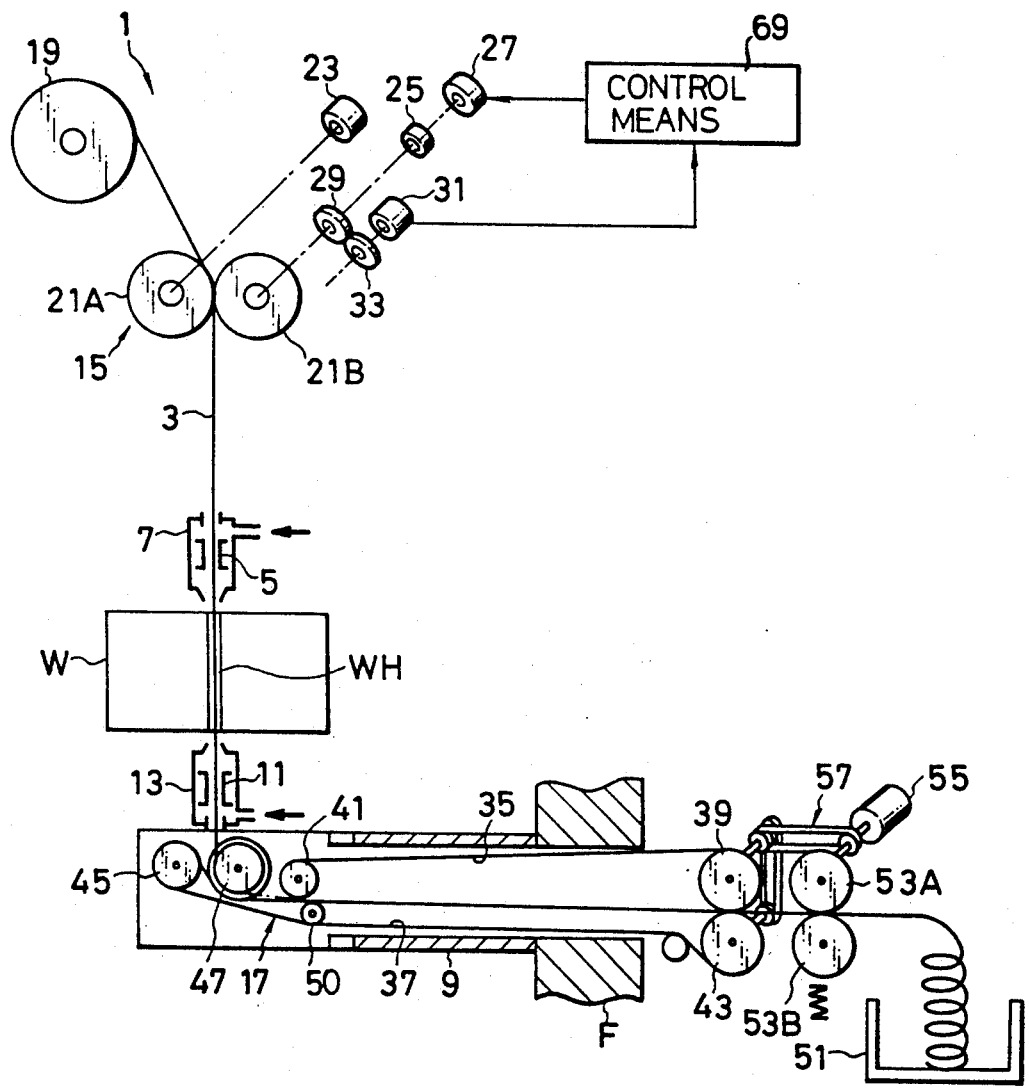
FIG. 1 is an explanatory drawing showing the general configuration of first embodiment of the wire cutting electric discharge machine of the present invention.

Now referring to FIG. 1, a wire cutting electric discharge machine 1 is provided with a table (omitted from the drawings) which is freely movable in the X-axis and Y-axis directions. An upper wire guide device 7 is provided in a vertically-position-adjustable manner above a workpiece W which is secured to the table by a securing tool. The upper wire guide device 7 is provided with a wire guide 5 which guides a wire electrode 3 and a nozzle opening which supply process liquid onto the electric discharge process section of the workpiece W. A lower arm 9 provided horizontally on a frame F of the wire cutting electric discharge machine 1 is positioned below the workpiece W. A lower wire guide device 13, which is of the same construction as an upper wire guide section 7, is provided with a wire guide section 11 and positioned on the end of the lower arm 9.

A wire feed section 15 which feeds the wire electrode 3 is positioned above the upper wire guide section 7. Also, provided inside the lower arm 9 is a transport mechanism comprising a transport belt means 17 for transporting the wire electrode 3 laterally away from the area of process after it has been used in the electric discharge process on the workpiece W in the electric discharge section.

Provided in the wire feed section 15 is a wire supply reel 19 on which the wire electrode 3 is coiled. The wire electrode 3 which is uncoiled from the wire supply reel 19 is interposedly pressed between a pair of wire feed rollers 21A, 21B and is fed to the workpiece W by the wire feed rollers 21A, 21B.

A suitable brake device 23 is linked to the wire feed roller 21A. The brake device 23 is for braking the wire feed roller 21A.

A servomotor 27 such as a pulse motor is linked to the other wire feed roller 21B through a magnetic clutch 25. A gear 29 is provided coaxially on the wire feed roller 21B, and a gear 33 which is connected to a rotary encoder 31 engages the gear 29.

Accordingly, the wire feed roller 21B is rotatably driven by the rotation of the servomotor 27 with the magnetic clutch 25 engaged. Accordingly, the wire electrode 3 cna be fed forward or drawn back, interposedly pressed between the wire feed rollers 21A, 21B. Also, by the detection of the direction and amount of rotation of the wire feed roller 21B by the rotary encoder 31, the amount of the wire electrode 3 fed out (length fed out) can be detected. Accordingly, for example, after a break in the wire electrode 3, it is possible to detect the position of the end of the wire electrode 3. Further, the speed of movement of the wire electrode 3 and breaks in the wire electrode 3 can detected by detection of the rotational speed of the rotary encoder 31.

The transport belt means 17 in the transport mechanism comprises an upper transport belt 35 and a lower transport belt 37 which press together at one section to interposedly secure the wire electrode 3 between them. The upper transport belt 35 runs around an upper drive pulley 39 supported on the frame F and around an upper follower pulley 41 provided of the end of the lower arm 9. The lower transport belt 37 runs around a lower drive pulley 43 supported on the frame F and a lower follower pulley 45 provided at a slightly higher position from the upper follower pulley 41 on the end of the lower arm 9.

A guide roller 47 is provided at the starting end of the transport belt means 17 to guide the wire electrode 3 which passes through and descends from the lower wire guide device 13 laterally away from the area of process. The guide roller 47 of this embodiment is formed with a V-shaped peripheral groove 47G.

Figure 2:
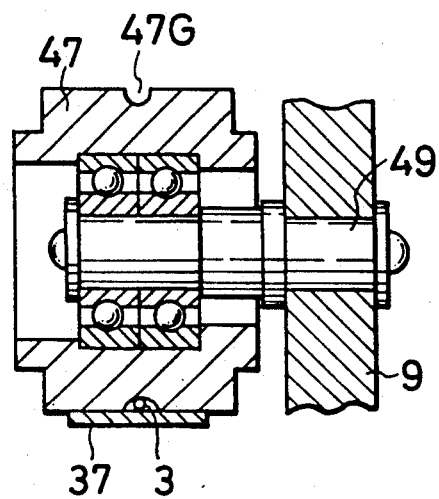
FIG 2 is a sectional explanatory drawing showing a grooved roller mounted on the embodiment of the present invention.

More specifically, as shown in FIG. 2, the guide roller 47 is supported in a freely rotatable manner on the lower arm 9 through a shaft 49 between the upper follower pulley 41 and the lower follower pulley 45. The lower side of the guide roller 47 comes in contact with and is covered by the upper surface of the lower transport belt 37 at a position close to the lower follower pulley 45. Accordingly, the guide roller 47 is rotatably driven by the lower transport belt 37, and the wire electrode 3 is guided laterally away from the area of process by the groove 47G without being interposed between the lower transport belt 37 and the grooved roller 47.

An idler pulley 50 which presses the upper side of the lower transport belt 37 to the lowerr side of the upper transport belt 35 is provided at the contact section of the starting end of the upper transport belt 35 and the lower transport belt 37. With this idler pulley 50, the wire electrode 3, which is laterally away from the area of process by the grooved roller 47, is reliably transported laterally further away from the process area while being interposedly pressed between the belts 35, 37 of the transport mechanism.

In order to convey the wire electrode 3 into a recovery box 51 after it has been transported laterally by the transport belt means 17, a pair of withdrawal and pull out drive rollers 53A, 53B are provided in a freely rotatable manner at the terminating end of the transport belt means 17. The drive rollers 53A, 53B interposedly hold the wire electrode 3 and guide it to the recovery box 51. The drive roller 53A is linked to a drive motor 55. The upper drive pulley 39 and the lower drive pulley 43 are connected to the drive motor 55 through a belt transmission mechanism 57.

With the above configuration, the wire electrode 3 passing through the lower wire guide device 13 is transported laterally and can be collected in the recovery box 51 by driving the transport belt means 17 and the withdrawal drive rollers 53A, 53B via the drive motor 55. The transport speed of the transport belt 17 is set at a higher rate than the transport speed of the wire electrode 3 in the wire feed section 15.

In the configuration outlined above, the pulse motor 27 is rotatably driven from a control means 69 to feed the wire electrode 3 to the workpiece W via the upper wire guide device 5. The end of the wire electrode 3 is passed through a through-hole WH formed in the workpiece W, then through the lower wire guide device 13, and when it reaches the guide roller 47, the end of the wire electrode 3 enters the space between the groove 47G of the guide roller 47 and the lower transport belt 37 and is guided laterally.

Subsequently, low pressures are applied to the end of the wire electrode 3 interposed between the upper transport belt 35 and the lower transport belt 37. The wire electrode 3 is then transported laterally, and passed between the withdrawal drive rollers 53A, 53B. The drive rollers 53A, 53B convey the wire electrode 3 into the recovery box 51. Then, when the ends of the wire electrode 3 contact the bottom of the recovery box 51, a detection device (ommitted from the drawings) detects the presence of the wire electrode 3 and starts the electric discharge process.

As outlined above, when the wire electrod 3 is interposedly pressed between the drive rollers 53A, 53B the wire electrode 3 is pulled at a higher speed than the speed in the wire feed section 15, so that tension is applied to the wire electrode 3 between the wire feed rollers 21A, 21B and the drive rollers 53A, 53B. When tension is applied to the wire electrode 3, the wire electrode 3 contacts the bottom of the groove 47G in the guided roller 47 over a comparatively long section of the groove.

Figure 3:
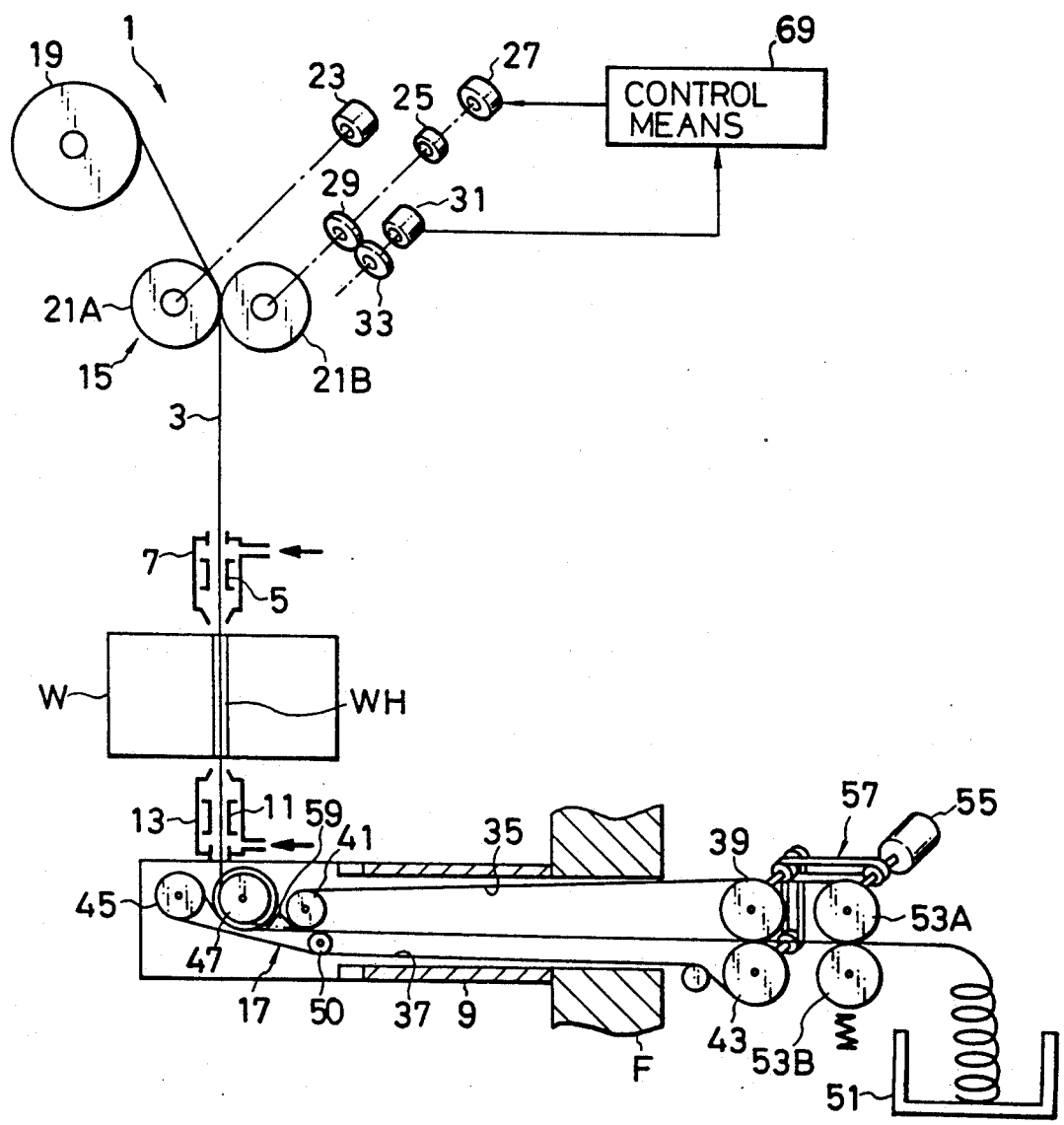
FIG. 3 is an explanatory drawing of a second embodiment of the present invention.

FIG. 3 shows a second embodiment of the present invention. In this embodiment, a wire guide 59 which guides the wire electrode 3 is provided between the grooved guide roller 47 and the upper follower pulley 41 in the transport mechanism.

With this configuration, even in the case where there is a tendency for the end of the wire electrode 3 which passes through the guide roller 47 to be lifted up, sticking to the roller 47, the end of the wire electrode 3 is removed from the guide roller 47, and the transport between the upper and lower transport belts 35, 37 in the transport mechanism is very reliable.

As can be understood from the foregoing explanation of the embodiments, in the presesnt invention, tension is imparted to the wire electrode by the drive rollers provided at the termination end of the transport belt, so that the transport belt simply has to transport the wire electrode. This results in a longer service life for the transport belt.

By the provision of the guide roller with the groove at the starting end of the transport belt means, the wire electrode contacts the bottom of the groove in the guide roller over a comparatively long section of the groove. Therefore the transmission of any lateral vibration in the drive roller or vibration at the contact section of the upper and lower transport belts to the processing region of the workpiece can be prevented. The processing precision is therefore effectively increased.

The wire cutting electric discharge machine of the present invention is not limited to the embodiments herein described. Various modifications will become evident to those skilled in the art after receiving the teachings of the present disclosure, without departing from the scope thereof.

What is claimed is:

1. A wire cutting electric discharge machine comprising:
   a guide roller which guides a wire electrode laterally away from an area of process of the discharge machine, the guide roller being provided below a workpiece which is being processed in said discharge machine;

a transport mechanism which transports laterally the wire electrode from said guide roller further away from said area of process of said discharge machine; and a withdrawal mechanism positioned at a portion following said transport mechanism, and which engages and withdraws the wire electrode transported by said transport mechanism;

wherein a wire guide is provided between said guide roller and said transport mechanism which guides the electrode toward said transport mechanism.

2. A wire cutting electric discharge machine which processes a metal workpiece with a wire electrode having a diameter, said wire cutting electric discharge machine having an automatic wire electrode threading mechanism, comprising:

a transport mechanism for laterally transporting the wire electrode fed from an area for processing the workpiece, said transport mechanism including upper and lower transport belts which are pressed together to interposedly secure the wire electrode therebetween;

a withdrawal mechanism disposed adjacent to a portion following said transport mechanism for pinching and then withdrawing the wire electrode transported by said transport mechanism;

a guide roller for guiding the wire electrode fed from said processing area to said transport mechanism, said guide roller being disposed below said processing area such said guide roller partially contacts with said lower belt of said transport mechanism, said guide roller having a circumferential groove of a size through which the electrode fed from said processing area is guided, and the size of said groove in the radial direction of said guide roller being larger than the diameter of the wire electrode; and a wire guide for guiding the wire electrode from said processing area by said guide roller between said transport belts of said transport mechanism.

3. A wire cutting electric discharge machine as claimed in claim 2, wherein said wire guide is disposed between said guide roller and said upper belt of said transport mechanism.

* * * * *